F. C. BUECHMAN.
CHART SUPPORT FOR RECORDING INSTRUMENTS.
APPLICATION FILED MAR. 7, 1921.
1,415,306.
Patented May 9, 1922.
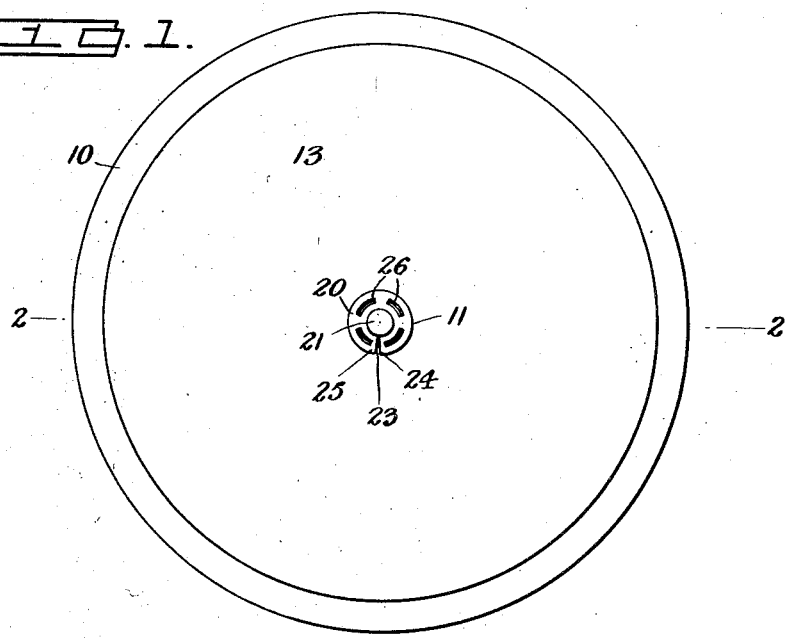
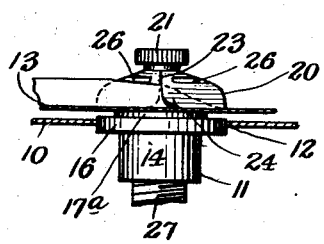
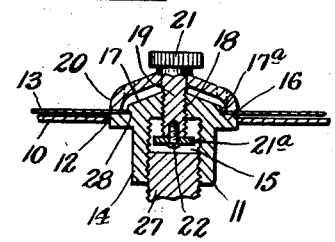
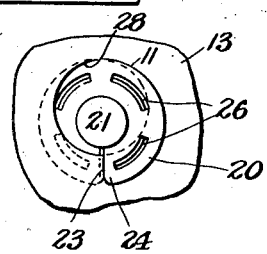
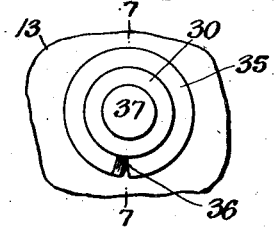
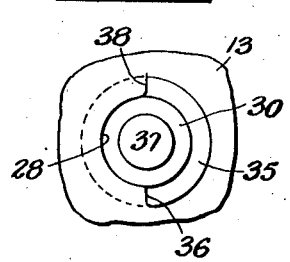
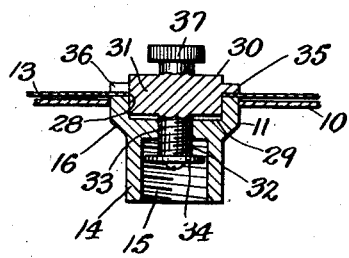
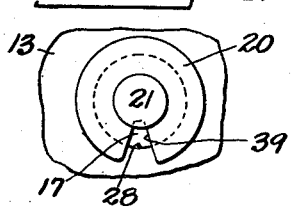
Inventor
Frederick C. Buechman,
By his Attorneys

UNITED STATES PATENT OFFICE.

FREDERICK C. BUECHMAN, OF BROOKLYN, NEW YORK.

CHART SUPPORT FOR RECORDING INSTRUMENTS.

1,415,306.   Specification of Letters Patent.   Patented May 9, 1922.

Application filed March 7, 1921. Serial No. 450,324.

*To all whom it may concern:*

Be it known that I, FREDERICK C. BUECHMAN, a citizen of the United States, and residing at Brooklyn, in the county of Kings and State of New York, have invented certain new and useful Improvements in Chart Supports for Recording Instruments, of which the following is a specification, such as will enable those skilled in the art to which it appertains to make and use the same.

This invention relates to recording instruments of various kinds and classes, as for example, time clocks, heat recording instruments and pressure recording instruments, and the invention relates more particularly to means for supporting the charts of such instruments, and the object of the invention is to provide a support of the class and for the purpose specified which is so constructed as to facilitate the mounting of a chart in connection with a suitable recording instrument and detaching said chart therefrom, whenever desired; and with this and other objects in view the invention consists in a support of the class described, which is simple in construction and operation and efficient in use, and which is constructed and operated as hereinafter described and claimed.

The invention is fully disclosed in the following specification, of which the accompanying drawing forms a part, in which the separate parts of my improvement are designated by suitable reference characters in each of the views, and in which:—

Fig. 1 is a diagrammatic plan view of a part of a recording instrument provided with one of my improved supports and showing a chart mounted in position;

Fig. 2 a partial section on the line 2—2 of Fig. 1 on an enlarged scale;

Fig. 3 a view similar to Fig. 2 but showing the support in full lines and indicating the method of mounting a chart in connection with said support;

Fig. 4 a plan view of the construction shown in Fig. 3;

Fig. 5 a view similar to Fig. 1 on an enlarged scale and showing a modification;

Fig. 6 a view similar to Fig. 5 and showing the method of attaching a chart with the support shown in Fig. 5;

Fig. 7 a section on the line 7—7 of Fig. 5; and,

Fig. 8 a view similar to Fig. 1 but showing only a part of the construction and showing another modification.

In Figs. 1 to 4 inclusive, I have illustrated at 10 the facing disk of a suitable recording instrument which, in practice, is usually fixed in the casing of the instrument and at 11 I have shown one form of chart support which passes through and is rotatable in an aperture 12 in the disk 10 and the support 11 is adapted to hold and rotate a chart 13 of any kind or class over the outer face of the disk 10.

The disk 10 and the specific method of mounting the same forms no part of this invention, nor am I limited to any particular form of chart, and for this reason no specific structure or characteristic of these parts have been shown.

My improved support 11 comprises, in the form of construction shown in Figs. 1 to 4 inclusive, a body portion 14 having a central threaded aperture 15 at one end portion thereof, and an enlarged head 16 at the other end portion thereof which passes into the aperture 12 of the disk 10 and the outer face of the head 16 is preferably conical in form as shown at 17, and said head is provided with an annular shoulder $17^a$ on the conical face 17, and said head is also provided centrally thereof with a threaded aperture 18 through which a threaded stud 19 rigidly secured to a cap 20 is adapted to pass, said cap being provided with a reduced knurled head 21 by means of which the cap 20 may be rotated.

The stud 19 which is rigidly secured to or formed integrally with the cap 20 after it has passed through the aperture 18, is provided with a washer $21^a$ held in place by a screw 22, and this construction prevents the detachment or removal of the cap 20 from the body portion 14. The cap 20 is provided with a radial slit or aperture 23 which extends through the periphery portion of said cap and the free corner portions 24 and 25 formed, in said cap, by said slit are preferably raised and lowered respectively to a slight extent. The cap 20 is also preferably provided with a plurality of spaced apertures 26 which are in vertical alinement with the annular shoulder $17^a$ of the head 16 to facilitate the attachment of the chart 13 with the support 11.

The body portion 14 is mounted upon a suitable shaft, part of which is shown at 27 in Figs. 2 and 3 of the drawing, and this shaft is rotated by the mechanism of the instrument in connection with which the chart 13 is employed, and said chart is provided with a central aperture 28, the dimensions of which can be the same as that of the shoulder portion 17ª on the conical face 17 of the support 11, and in mounting the chart in connection with the support 11, the edge portion of the chart around the aperture 28 thereof is passed through the slit 23 beneath the corner portion 24 and above the corner portion 25 of the cap 20, as clearly shown in Figs. 3 and 4 of the drawing, after which the cap 20 is rotated to the right, in which operation the slit 23 will pass around the edge portion of the chart 13 about the aperture 28 and said chart will be threaded through the cap 20, or the slit 23 thereof, upon the completion of one revolution or a partial revolution of the cap 20. The chart 13 is then properly set in position upon the enlarged head 16 or, in other words, the conical face 17 is passed through the aperture 28 in said chart so as to bring the chart into position as shown in Figs. 1 and 2, and when said chart is properly positioned upon the disk 10, the cap 20 is rotated to move the same inwardly or backwardly so as to clamp the chart 13 between said cap and the enlarged head 16 of the support 11. In the above operation of mounting the chart in position, the apertures 26 will facilitate the proper placement of said chart upon the head 16 or over the conical face 17 of said head, this being a very important fact in that in many instruments of the class under consideration, it is essential that the chart be properly centered upon its support.

In detaching the chart 13 from the support 11, the cap 20 is first moved outwardly to such an extent as to permit of the disengagement of the chart from the shoulder portion 17ª of the head 16 after which the edge portion of said chart about the aperture 28 is passed through the slit 23 and over the corner portion 25, after which the cap 20 is rotated to the left to thread said chart through said cap as will be readily understood.

In the construction shown in Figs. 5 to 7 inclusive, I have shown a modification in which the head portion 16 of the body portion 14 is provided on its outer face with a countersunk aperture 29 and substituted for the cap 20 is a cap 30 comprising, in the form of construction shown a cylindrical body portion 31 adapted to rotate in the aperture 29, and said body portion being provided with an inwardly directed threaded stud 32 which passes through a correspondingly threaded aperture 33 in the body portion 14 and a washer 34 is mounted upon the end of the stud 32 within the threaded aperture 15, and this washer prevents the detachment of the cap 30 from the body portion 14. The cylindrical body portion 31 is provided with an annular projecting flange 35 which is provided at a predetermined point with a radial slot 36 as is clearly shown in said figures, and the outer face of the cap 30 is provided with a reduced and milled head 37 by means of which said cap may be rotated.

With the form of construction shown in Figs. 5 to 7 inclusive, the chart 13 is provided at a predetermined point about the aperture 28 therein with a radial slit 38 and in attaching the chart to the support shown in said figures, one edge portion of the chart adjacent to the slit 38 is passed beneath the flange 35 of the cap 30 at the radial slot 36, and said cap is rotated to the right as is partially illustrated in Fig. 6 of the drawing to thread the chart through said cap and upon the completion of a revolution, or partial revolution of said cap, the chart will assume the position shown in Figs. 5 and 7 and by continuing the rotation of said cap the chart will be clamped and securely held between the flange 35 of the cap 30 and the outer face of the head 16.

In the form of construction shown in Figs. 5 to 7 inclusive, it will be noted that the cylindrical body portion 31 inwardly of the flange 35 will be of the same diameter as that of the aperture 28 in the chart 13 and will form the guide or centering medium of the support instead of the shoulder portion 17ª on the head 16 as in the construction shown in Figs. 1 to 4 inclusive. It will also be noted that in both forms of construction the outer face of the enlarged head 16 of the support extends a slight distance beyond the outer face of the disk 10 thus preventing the free rotation of the chart 13 over the face of said disk without frictional engagement with said disk.

In Fig. 8 of the drawing, I have shown another modification of the construction shown in Figs. 1 to 4 inclusive, in which the aperture 26 of the cap 20 is omitted, and substituted for the slot 23 is a substantially U-shaped cut-out portion 39 and with this exception the remainder of the construction will be the same as that shown in said figures. The object of a construction similar to that shown in Fig. 8 is to facilitate the mounting of a chart in connection with the support when charts of comparatively heavy material are employed, in which a greater space is required to permit of the free passage of the chart through the cap 20 in threading the chart into position. It will be understood, however, that I am not necessarily limited to any specific form of cut-out portion in the cap of the support nor to the specific means of retaining the cap against detachment from the main body portion of the support, and various other changes in and modifications of the constructions herein shown and described may be made, within the scope of the appended claims, without departing from the spirit of my invention or sacrificing its advantages.

Having fully described my invention, what I claim as new and desire to secure by Letters Patent, is:—

1. A device of the class described comprising a suitable body portion, a cap movably mounted in connection with said body portion and adapted to move toward and from one face thereof, and said cap being provided with means whereby an article may be threaded through said cap placed between the abutting faces of said body portion and said cap and clamped therebetween.

2. A device of the class described comprising a suitable body portion, a cap irremovably mounted in connection with said body portion and capable of movement toward and from one face thereof, and said cap being apertured to permit of the threading of an article therethrough whereby said article may be clamped between the abutting faces of said cap and said body portion.

3. A device of the class described comprising a suitable body portion, a cap irremovably mounted in connection with said body portion and capable of movement toward and from one face thereof, said cap being apertured to permit of the threading of an article therethrough whereby said article may be clamped between the abutting faces of said cap and said body portion, and means whereby said article may be centered in said device.

4. A device of the class described comprising a body portion, a cap in threaded engagement with and irremovable from said body portion, said cap being movable toward and from said body portion, means whereby an article may be threaded through said cap to position the same between the abutting faces of said cap and body portion and whereby said article may be clamped therebetween.

5. A chart support of the class described comprising a rotatable body portion, means for mounting said body portion in connection with a suitable support, a cap irremovably mounted in connection with said body portion and adapted to move toward and from the same, and means whereby a chart may be threaded through said cap to position the same between the abutting faces of said cap and body portion and to clamp said chart therebetween.

6. A chart support of the class described comprising a rotatable body portion, means for mounting said body portion in connection with a suitable support, a cap irremovably mounted in connection with said body portion and adapted to move toward and from the same, means whereby a chart may be threaded through said cap to position the same between the abutting faces of said cap and body portion and to clamp said chart therebetween, and means for centering said chart in said support.

In testimony that I claim the foregoing as my invention I have signed my name in presence of the subscribing witnesses this 5th day of March 1921.

FREDERICK C. BUECHMAN.

Witnesses:
C. E. MULREANY,
H. E. THOMPSON.